Figure 1:
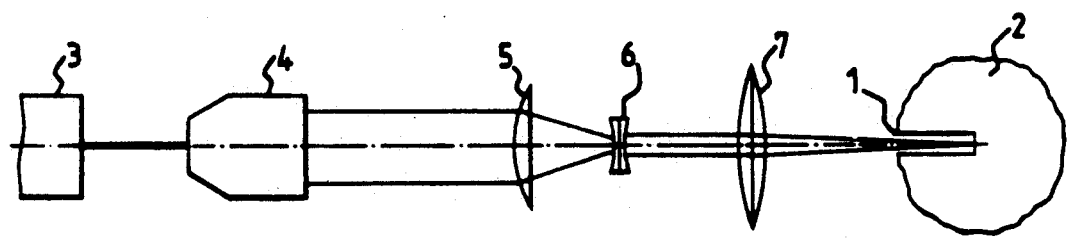

United States Patent
Cooper et al.

[11] Patent Number: 5,248,877
[45] Date of Patent: Sep. 28, 1993

[54] MAKING AN ELONGATE CUT USING HIGH ENERGY RADIATION

[75] Inventors: Martin Cooper, Marlow; Andrew D. G. Stewart, Reading, both of England

[73] Assignee: Anstalt Gersan, Vaduz, Liechtenstein

[21] Appl. No.: 655,401

[22] PCT Filed: Aug. 15, 1989

[86] PCT No.: PCT/GB89/00942
§ 371 Date: Apr. 4, 1991
§ 102(e) Date: Apr. 4, 1991

[87] PCT Pub. No.: WO90/01392
PCT Pub. Date: Feb. 22, 1990

[30] Foreign Application Priority Data
Aug. 15, 1988 [GB] United Kingdom ............... 8819351

[51] Int. Cl.$^5$ ............................. B23K 26/00
[52] U.S. Cl. ............... 219/121.67; 219/121.72; 219/121.75
[58] Field of Search ............ 219/121.67, 121.72, 219/121.75; 125/30.01

[56] References Cited

U.S. PATENT DOCUMENTS

| | | |
|---|---|---|
| 3,534,642 | 10/1970 | Cruickshank et al. |
| 3,941,973 | 3/1976 | Luck et al. |
| 4,401,876 | 8/1983 | Cooper ............... 125/30.1 X |
| 4,546,231 | 10/1985 | Gresser et al. ............... 219/121.73 |

FOREIGN PATENT DOCUMENTS

| | | |
|---|---|---|
| 0102732 | 3/1984 | European Pat. Off. |
| 0116933 | 8/1984 | European Pat. Off. |
| 0213471 | 3/1987 | European Pat. Off. |
| 1565144 | 2/1970 | Fed. Rep. of Germany |
| 2658682 | 6/1978 | Fed. Rep. of Germany |
| 0002790 | 1/1989 | Japan ............... 219/121.75 |
| 1087534 | 10/1967 | United Kingdom |
| 2052369 | 1/1981 | United Kingdom |
| 2076334 | 12/1981 | United Kingdom |

OTHER PUBLICATIONS

Electro-Optics/Laser 80 Conference and Exposition, Boston, Mass., Nov. 19-21, 1980, pp. 223, 226.
IBM Technical Disclosure Bulletin, vol. 14, No. 9, Feb. 1972, pp. 2641 and 2642.

*Primary Examiner*—C. L. Albritton
*Attorney, Agent, or Firm*—Kerkam, Stowell, Kondracki & Clarke

[57] ABSTRACT

To make an elongate cut (1) in a diamond (2) using a laser radiation, a cylindrical optical system (5, 6) is used which converges the radiation at a greater angle of convergence in the plane of the cut (1) than in the transverse plane. In this way, the focal spot energy density is increased and cutting at depth is made more effective.

13 Claims, 1 Drawing Sheet

MAKING AN ELONGATE CUT USING HIGH ENERGY RADIATION

BACKGROUND OF THE INVENTION

The present invention relates to making an elongate cut using high energy radiation focussed to a focal spot in the cut, the radiation usually being a laser beam. A blind groove or hole may be formed in the workpiece, or the workpiece may be cut or pierced right through. The invention has general applicability and in general terms, unnecessary material removal must be avoided as this slows down the cutting process; however, the invention is particularly applicable to gemstones, where it is specially important to avoid unnecessary material removal, and it is also necessary to avoid applying excessive thermal stress; in addition, a particular problem with gemstones such as diamond is that usually only a small percentage of the radiation may be absorbed, so it is important that coupling of the energy to the workpiece be as effective as possible.

In gemstones, the laser cutting can be referred to as forming a kerf (a groove, either for cleaving or for later sawing), or sawing (cutting right through). In other applications using jewels or gemstones, a blind hole or a through-hole may be formed in order to employ the stone as a bearing.

When sawing gemstones, normal practice is to form a V-section, which should be as narrow as possible to reduce weight loss. There is automatic machinery (work handling) for benching out the V-shape (i.e. scanning the area formed by the length and width of the cut) and for refocussing the beam as the cut depth increases.

A fundamental problem is that the energy density in the focal spot should be as great as possible, but a smaller focal spot (and thus higher energy density) can only be obtained by increasing the cone angle of the focussed beam (i.e. higher numerical aperture). The machined V-section has then to be wider, otherwise the laser energy focussed into the cut is apertured (vignetted) at the entrance to the cut as the depth increases.

THE INVENTION

In accordance with the invention, a system is used which converges the radiation at a substantially greater angle of convergence in the plane in which the cut lies than in the plane transverse to the cut.

Using the invention, the energy density of the focal spot can be increased without widening the machined V-section, as the uninterrupted access provided longitudinally of the cut is utilised. Consequently the angle of the V-section may be reduced and rate of propagation of the cut increased.

Using the invention, the amount of laser energy entering the cut can be increased by cylindrically compressing a spherically expanded beam in the transverse direction. This allows the use of higher spherical beam expansion ratios than is possible without use of the invention because the effect of vignetting by the cut opening is reduced.

The numerical aperture of the optical system is higher in the longitudinal direction than in the transverse direction. The focii must be at the same depth in each plane (transverse and longitudinal). The focal spot (as seen on the flat bottom of the cut) will be an ellipse with its major axis transverse of the longitudinal direction of the cut. The size of the focal spot in the major axis (transverse) direction will be larger than that without using the invention. The full advantage of the invention cannot be observed unless the spherical beam expansion coefficient is increased, so that the focal spot area is reduced without a proportional reduction in the energy entering the cut. The beam can be expanded and then focused in both planes in order to achieve a sufficiently high focal spot energy density.

If the numerical aperture were to be increased by the same factor in both planes (transverse and longitudinal), as would be the case with a conventional beam expander, any increase in energy density resulting from a reduction in focal spot area, will be at least partially offset by a reduction in energy entering the cut, due to vignetting at the opening, as cutting progresses.

In practice, the ratio of convergence angles (included angle) of the transverse to longitudinal directions can be any value less than unity but the preferred values are from 0.5 to 0.25. In order to achieve this cylindrical optics may be used, preferably with a beam compressor or beam expander having cylindrical lenses.

THE DRAWING

Figure 2:
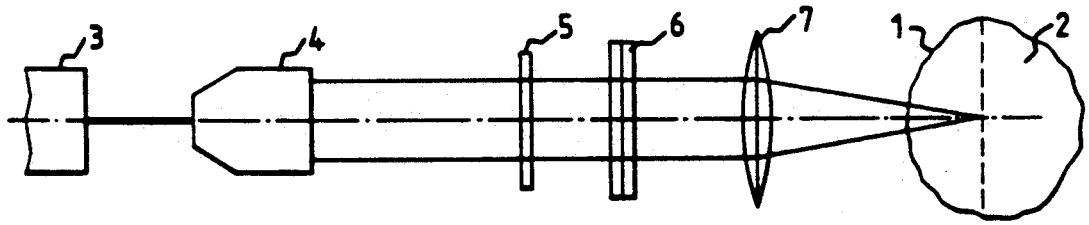

The invention will be further described, by way of example, with reference to the accompanying drawing, in which:

FIG. 1 is a schematic view, showing the optical system and a stone being cut, in section transversely to the cut; and FIG. 2 is a schematic view of the optical system, as seen in section normal to that of FIG. 1.

A cut 1 is being formed in a diamond 2. The optical system includes a laser 3, a spherical beam expander 4, a beam contractor formed by two lenses 5,6, and a focussing lens 7. The lenses 5,6 are cylindrical lenses, forming a beam compressor for contracting the beam in the plane of FIG. 1 but not in the plane of FIG. 2. In this way, the angle of convergence is substantially greater in the plane longitudinally of the cut (FIG. 2) than in the plane transversely of the cut (FIG. 1). The focussing lens 7 can be a conventional spherical lens. The laser 3 can be a high-power Q-switched YAG laser in fundamental $TEM_{oo}$ mode—the beam has a Gaussian distribution and produces a very small focal spot.

In accordance with the present invention, the beam of radiation is spherically expanded by beam expander 4 and is then cylindrically compressed as viewed normal to the plane of the transverse cut by cylindrical lenses 5 and 6. As can be seen from a comparison of FIG. 2 to FIG. 1, the beam entering the focusing means is substantially parallel sided and substantially narrower as viewed normal to the plane transverse to the cut (FIG. 1) than as viewed normal to the plane in which the cut lies (FIG. 2).

In practice, magnification values of 10 to 20× have been used for the beam expander 4 and 0.25 to 0.5× for the beam contractor 5,6. If the width of the beam between the laser 3 and the beam expander 4 is w, it is typically 3w–5w between the lenses 6,7 in FIG. 1 and 10w–20w between the lenses 6,7 in FIG. 2.

The present invention has been described above purely by way of example, and modifications can be made within the spirit of the invention.

We claim:

1. A method of making an elongate cut using high energy radiation, comprising passing a beam of radiation through a system which cylindrically affects the beam such that the beam is converged to a focal spot in the cut both as viewed normal to the plane in which the cut lies and as viewed normal to the plane transverse to the cut, the angle of convergence to the focal spot being substantially greater as viewed normal to the former plane than as viewed normal to the latter plane and wherein the beam of radiation is spherically expanded and is then cylindrically compressed as viewed normal to the plane transverse to the cut.

2. A method of making an elongate cut using high energy radiation, comprising passing a beam of radiation through a system which cylindrically affects the beam such that the beam is converged to a focal spot in the cut both as viewed normal to the plane in which the cut lies and as viewed normal to the plane transverse to the cut, the angle of convergence to the focal spot being substantially greater as viewed normal to the former plane than as viewed normal to the latter plane and further including the step of effecting a cut in an article, the article being a gemstone.

3. The method of claim 1 wherein focussing means are used to converge the beam to the focal spot, the beam entering the focussing means being substantially narrower as viewed normal to the plane transverse to the cut than as viewed normal to the plane in which the cut lies.

4. The method of claim 3, wherein the beam entering the focussing means is substantially parallel sided, both as viewed normal to the plane in which the cut lies and as viewed normal to the plane transverse to the cut.

5. The method of claim 3, including the step of effecting a cut in an article, the article being a gemstone.

6. The method of claim 4, including the step of effecting a cut in an article, the article being a gemstone.

7. Apparatus for making an elongate cut using high energy radiation, comprising a system which cylindrically affects a beam of the radiation to converge the beam to a focal spot in the cut both as viewed normal to the plane in which the cut lies and as viewed normal to the plane transverse to the cut, the angle of convergence to the focal spot being substantially greater as viewed normal to the former plane than as viewed normal to the latter plane and wherein said system comprises a spherical beam expander for expanding the beam in both said planes, followed by a cylindrical beam compressor for compressing the beam as viewed normal to the plane transverse to the cut.

8. The apparatus of claim 7, wherein the system comprises focussing means for converging the beam to the focal spot, and the beam entering the focussing means is substantially narrower as viewed in the plane transverse to the cut than as viewed in the plane in which the cut lies.

9. The apparatus of claim 8, wherein the beam entering the focussing means is substantially parallel sided both as viewed normal to the plane in which the cut lies and as viewed normal to the plane transverse to the cut.

10. The apparatus of claim 7, and comprising a laser for forming the beam, the beam having a Gaussian distribution.

11. The apparatus of claim 8, and comprising a laser for forming the beam, the beam having a Gaussian distribution.

12. The apparatus of claim 9, and comprising a laser for forming the beam, the beam having a Gaussian distribution.

13. The apparatus of claim 7, wherein the system comprises means for producing a cylindrically affected parallel sided beam of radiation and a means for focusing the parallel sided beam of radiation.

* * * * *